US012072970B2

(12) United States Patent
Secomandi et al.

(10) Patent No.: US 12,072,970 B2
(45) Date of Patent: Aug. 27, 2024

(54) METHOD, SYSTEM, AND A GUI CLIENT FOR GENERATING PASSWORD BASED ON IMAGES CAPTURED BY USER

(71) Applicant: HCL Technologies Italy S.p.A., Italy (IT)

(72) Inventors: Antonio Secomandi, Italy (IT); Viviana Tripodi, Italy (IT)

( * ) Notice: Subject to any disclaimer, the term of this patent is extended or adjusted under 35 U.S.C. 154(b) by 350 days.

(21) Appl. No.: 17/686,459

(22) Filed: Mar. 4, 2022

(65) Prior Publication Data

US 2023/0281295 A1 Sep. 7, 2023

(51) Int. Cl.
| | |
|---|---|
| *G06F 21/46* | (2013.01) |
| *G06F 21/36* | (2013.01) |
| *G06V 10/74* | (2022.01) |
| *G06V 10/75* | (2022.01) |
| *H04L 9/40* | (2022.01) |

(52) U.S. Cl.
CPC .............. *G06F 21/46* (2013.01); *G06F 21/36* (2013.01); *G06V 10/751* (2022.01); *G06V 10/761* (2022.01); *H04L 63/083* (2013.01)

(58) Field of Classification Search
None
See application file for complete search history.

(56) References Cited

U.S. PATENT DOCUMENTS

| | | | |
|---|---|---|---|
| 7,174,462 B2 | 2/2007 | Pering et al. | |
| 8,086,745 B2 | 12/2011 | Liew et al. | |
| 8,392,975 B1 * | 3/2013 | Raghunath | G06F 21/36 726/19 |
| 8,881,251 B1 | 11/2014 | Hilger | |
| 9,053,294 B2 * | 6/2015 | Burkill | G06F 21/36 |
| 9,582,653 B2 * | 2/2017 | Franke | G06F 21/36 |
| 10,127,376 B1 * | 11/2018 | Robinson | G06F 21/36 |
| 11,709,925 B1 * | 7/2023 | Bellman-Greenwood | G06F 21/46 726/7 |
| 2004/0250138 A1 | 12/2004 | Schneider | |
| 2010/0169958 A1 | 7/2010 | Werner et al. | |
| 2010/0180336 A1 * | 7/2010 | Jones | H04L 9/3226 726/19 |

(Continued)

OTHER PUBLICATIONS

Sadiq Almuairfi, Prakash Veeraraghavan, and Naveen Chilamkurta, A novel image-based implicit password authentication system (IPAS) formobile and non-mobile devices (https://www.sciencedirect.com/science/article/pii/S0895717712001719), vol. 58, Issues 1-2, Jul. 2013, pp. 108-116.

(Continued)

*Primary Examiner* — Lashonda Jacobs-Burton
(74) *Attorney, Agent, or Firm* — Kendal M. Sheets

(57) ABSTRACT

A method and system for generating password based on images captured by a user is disclosed. In some embodiments, the method includes identifying a relevant event associated with a user; determining a set of preliminary information associated with the relevant event and a first set of images captured by the user during the relevant event; creating a plurality of second sets of images; presenting the plurality of second sets of images to the user; receiving from the user, for each of the plurality of second sets of images, user selection of the associated image added from the first set of images; generating a plurality of sets of keywords; receiving for each of the plurality of sets of keywords, a user selection of one or more keywords; and generating a password based on the one or more keywords selected by the user and associated images selected by the user.

22 Claims, 11 Drawing Sheets

(56) References Cited

U.S. PATENT DOCUMENTS

| | | | | |
|---|---|---|---|---|
| 2014/0068754 | A1* | 3/2014 | Burkill | G06F 21/46 726/18 |
| 2015/0121489 | A1* | 4/2015 | Yang | G06F 3/04817 726/6 |
| 2015/0178490 | A1* | 6/2015 | Tamboly | G06F 21/46 726/4 |
| 2015/0278509 | A1* | 10/2015 | Arning | G06F 21/46 726/6 |
| 2018/0288019 | A1* | 10/2018 | Dinia | H04L 63/083 |
| 2019/0163894 | A1* | 5/2019 | Nolan | G06F 21/36 |

OTHER PUBLICATIONS

Budi Hartanto, Bagus Santoso, and Siauw Welly, the Usage of Graphical Password as a Replacement to the Alphanumerical Password (https://www.researchgate.net/publication/43329259_THE_USAGE_OF_GRAPHICAL_PASSWORD_AS_A_REPLACEMENT_TO_THE_ALPHANUMERICAL_PASSWORD), Informatic Engineering, University of Surabaya, Jan. 2007.

Wayne Jansen, Serban Gavrila, Vlad Korolev, Rick Ayers, and Ryan Swanstrom, Picture Password: A Visual Login Technique for Mobile Devices (https://www.govinfo.gov/content/pkg/GOVPUB-C13-eb26d4f69b1dfeeef9f064c2309edd06/pdf/GOVPUB-C13-eb26d4f69b1dfeeef9f064c2309edd06.pdf), Wayne Jansen Serban Gavrila Vlad Korolev Rick Ayers Ryan Swanstro.

Alessandro Dinia, Riccardo Rossi, Antonio Secomandi, and Viviana Tripodi, Generating a password (https://uspto.report/patent/grant/10,587,591).

Moin Amjad, PicshaPass: Generate Random Passwords Through Pictures Shot From Your Android (https://www.makeuseof.com/tag/picshapass-generate-random-passwords-pictures-shot-android-phone/), Jun. 5, 2011.

* cited by examiner

METHOD, SYSTEM, AND A GUI CLIENT FOR GENERATING PASSWORD BASED ON IMAGES CAPTURED BY USER

TECHNICAL FIELD

Generally, the invention relates to password generation. More specifically, the invention relates to method and system for generating password based on images captured by user.

BACKGROUND

Passwords are widely used to access a lot of applications or software and are thus one of the main security parameters to secure our devices and accounts. Passwords are one of the most prevalent authentication means, and are utilized in every vertical, business, and application. However, with increase in Cybercrime, unauthorized access to devices or applications has become a serious threat to people who actively use computers or other high-tech gadget, such as a smartphone or tablet, in their day-to-day life, for doing everyday activities on web including checking mails to online banking.

Therefore, our devices and accounts need to be secured using strong and complicated passwords that are difficult to be deciphered or stolen by a scammer. However, when it comes to setting up strong and complicated passwords, one of the biggest concerns is forgetting these passwords, especially when there are numerous such passwords to remember. Additionally, many applications and/or device repeatedly require people to change their passwords periodically, thus the necessity of balancing the complexity with the ease of memorizing the passwords increases. As a result, creating and remembering passwords without either using commonly used passwords or passwords that can easily be retrieved based on basic user information has become a challenging task.

Therefore, there is a need of an efficient and reliable method and system for innovating password generation and provisioning process, such that, these passwords can easily be remembered by users and are complex enough to prevent any misuse, thereby protecting devices and applications from unauthorized access.

SUMMARY OF INVENTION

In one embodiment, a method for generating password based on images captured by a user is disclosed. The method may include identifying a relevant event from a plurality of events associated with a user based on predefined criteria. The method may include determining a set of preliminary information associated with the relevant event and a first set of images captured by the user during the relevant event. The method may include creating a plurality of second sets of images. It should be noted that, each of the plurality of second sets of images comprises an image from the first set of images and at least one similar image. In addition, at least one feature of each of the at least one similar image matches with corresponding feature of the image. The method may include presenting the plurality of second sets of images to the user. The method may include receiving from the user, for each of the plurality of second sets of images user selection of the associated image added from the first set of images. The method may include generating a plurality of sets of keywords in response to receiving the user selection. It should be noted that, each of the plurality of sets of keywords is generated for the image selected by the user from an associated second set of images. In addition, each of the plurality of sets of keywords are generated based on the set of preliminary information associated with the relevant event, the image selected by the user, images similar to the image selected by the user, and at least one predefined rule. The method may include receiving for each of the plurality of sets of keywords, a user selection of one or more keywords. The method may include generating a password based on the one or more keywords selected by the user for each of the plurality of sets of keywords and associated images selected by the user for each of the plurality of second sets of images.

In another embodiment, a method for providing access of a password protected application to a user is disclosed. The method includes rendering a plurality of sets of images to the user upon receiving a request from the user for accessing the password protected application. The method includes receiving a user selection of an image from each of the plurality of sets of images. It should be noted that, each image selected by the user corresponds to an image captured by the user during a relevant event. The method includes rendering to the user a set of keywords associated with each image selected by the user. The method includes receiving a user selection of one or more keywords from each of the set of keywords associated with each image. The method includes managing an access of the password protected application by the user in response to receiving the user selection.

In yet another embodiment, a graphical user interface (GUI) client for managing user access to a password protected applications is disclosed. The disclosed GUI client is configured to receive a request from a user for accessing the password protected application. The disclosed GUI client is configured to render, to the user, a plurality of sets of images upon receiving the request. The disclosed GUI client is configured to receive, from the user, a user selection of an image from each of the plurality of sets of images rendered to the user. The disclosed GUI client is configured to render, to the user, a set of keywords associated with each image selected by the user from each of the plurality of sets of images. The disclosed GUI client is configured to receive, from the user, a user selection of one or more keywords from the set of keywords rendered to the user. The disclosed GUI client is configured to manage an access of the password protected application in response to receiving the user selection.

In another embodiment, a system for generating password based on images captured by a user is disclosed. The system includes a processor and a memory communicatively coupled to the processor. The memory may store processor-executable instructions, which, on execution, may causes the processor to identify a relevant event from a plurality of events associated with a user based on predefined criteria. The processor-executable instructions, on execution, may further cause the processor to determine a set of preliminary information associated with the relevant event and a first set of images captured by the user during the relevant event. The processor-executable instructions, on execution, may further cause the processor to create a plurality of second sets of images. It should be noted that, each of the plurality of second sets of images comprises an image from the first set of images and at least one similar image. In addition, at least one feature of each of the at least one similar image matches with corresponding feature of the image. The processor-executable instructions, on execution, may further cause the processor to present the plurality of second sets of images to the user. The processor-executable instructions, on execution, may further cause the processor to receive from the user, for each of the plurality of second sets of images, user selection of the associated image added from the first set of images. The processor-executable instructions, on execution, may further cause the processor to generate a plurality of sets of keywords in response to receiving the user selection. It should be noted that, each of the plurality of sets of keywords is generated for the image selected by the user from an associated second set of images. In addition, each of the plurality of sets of keywords are generated based on the set of preliminary information associated with the relevant event, the image selected by the user, images similar to the image selected by the user, and at least one predefined rule. The processor-executable instructions, on execution, may further cause the processor to receive for each of the plurality of sets of keywords, a user selection of one or more keywords. The processor-executable instructions, on execution, may further cause the processor to generate a password based on the one or more keywords selected by the user for each of the plurality of sets of keywords and associated images selected by the user for each of the plurality of second sets of images.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
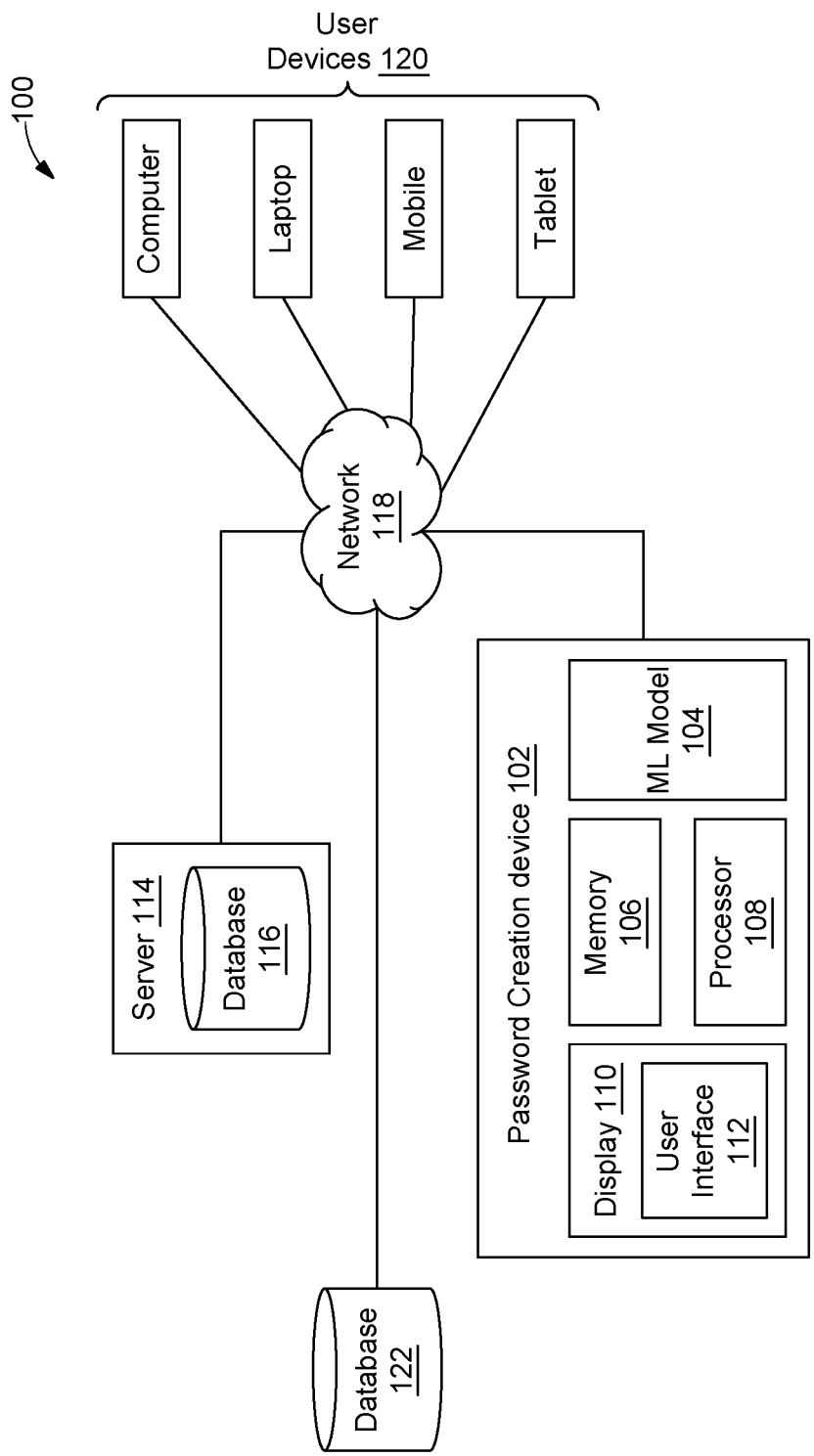
FIG. 1 illustrates a system for generating password based on images captured by a user, in accordance with an embodiment.

A system 100 for generating password based on images captured by a user, is illustrated in FIG. 1. In particular, the system 100 may include a password creation device 102 that may be responsible for generating password by automatically generating keywords based on images captured by the user. As will be appreciated, for ease of explanation the password generation has been explained with reference to a single user. In an embodiment, the images used for generating password for the user may correspond to the images of a user's life event. In order to generate the password, initially, the password creation device 102 may analyze actions performed by the user to determine occurrence of the relevant event from a plurality of events. Based on analysis of actions performed by the user, the password creation device 102, may identify a relevant event from the plurality of events associated with the user.

In an embodiment, the relevant event may be identified based on predefined criteria. A method of identifying the relevant event from the plurality of events associated with the user has been explained in detail in conjunction to FIG. 3. Once the relevant event is identified, the password creation device 102 may be configured to determine a set of preliminary information associated with the relevant event and a first set of images captured by the user during the relevant event. In an embodiment, the set of preliminary information may include, but is not limited to, date and time of each of the first set of images, last minute of the relevant event, duration of the relevant event, location of the relevant event, weather during occurrence of the relevant event, and verification of people in the vicinity of the user present during occurrence of the relevant event Upon determining the relevant event, the password creation device 102 may be configured to create a plurality of second sets of images. In an embodiment, each of the plurality of second sets of images may include an image from the first set of images and at least one similar image. Moreover, in order to create each of the plurality of second sets of images, at least one feature of each of the at least one similar image may match with corresponding feature of the image.

Further, in order to create the plurality of second set of images for each of the first set of images, the password generation device 102 may include a Machine Learning (ML) model 104. The ML model 104 may be configured to identify a set of similar images corresponding to each of the first set of images. The set of similar images may be identified based on a plurality of features. In an embodiment, the plurality of features may include at least one of an entity present in each of the set of similar images, background of each of the set of similar images, landscape of each of the set of similar images, environmental objects present in each of the set of similar images, climate in each of the set of similar images, or context of each of the set of similar images. The ML model 104 may select the set of similar images corresponding to each of the first set of images based on matching of the at least one feature of each of the set of similar images with the corresponding feature of at least one of the images selected from the first set of images. A method of selecting the at least one similar image has been explained in detail in conjunction with FIG. 4.

Once the plurality of second set of images are created, the password creation device 102 may be configured to present each of the plurality of second set of images to the user via the display 110 and the User Interface (UI) 112. Further, the password creation device 102 may be configured to receive a user selection of the associated image from each of the plurality of second set of images via the UI 112. It should be noted that, each of the associated image may correspond to an image added from the first set of images. Further, the password creation device 102 may prompt the user to provide chronological arrangement for each of the associated image selected by the user from each of the plurality of second sets of images.

Upon receiving the user selection of each of the associated image, the password creation device 102 may be configured to generate a plurality of sets of keywords corresponding to each of the associated image selected by the user from an associated second set of images. The password creation device 102 may generate each of the plurality of sets of keywords using the ML 104. In an embodiment, each of the plurality of sets of keywords may be generated by the password creation device 102 based on the set of preliminary information associated with the relevant event, the image selected by the user, images similar to the image selected by the user, and at least one predefined rule. In an embodiment, the images similar to the images selected by the user may correspond to one or more of the first set of images. A method of generating each of the plurality of sets of keywords has been explained in greater detail in conjunction with FIG. 6.

Once each of the plurality of sets of keywords are generated, the password creation device 102 may be configured to receive a user selection of one or more keywords from the plurality of sets of keywords. Upon receiving the user selection of the one or more keywords, the password creation device 102 may be configured to generate a password. The password creation device 102 may generate the password based on the one or more keywords selected by the user for each of the plurality of sets of keywords and the associated image selected by the user from each of the plurality of second sets of images. The complete process followed by the system 100 is further explained in detail in conjunction with FIG. 2 to FIG. 11.

Examples of the password creation device 102 may include, but are not limited to, a server, a desktop, a laptop, a notebook, a tablet, a smartphone, a mobile phone, an application server, or the like. The password creation device 102 may further include a memory 106, a processor 108, and the display 110. The display 110 may further include the UI 112. As described above, the user may interact with the password creation device 102 and vice versa through the display 110.

By way of an example, the display 110 may be used to display results (i.e., the relevant event, the set of preliminary information associated, the plurality of first set of images, the plurality of second sets of images, the plurality of sets of keywords, the generated password, etc.,) based on actions performed by the passwords creation device 102, to the user. Moreover, the display 110 may be used to display the plurality of events associated with the user in order to receive user input for confirmation of happening a meaning event, i.e., the relevant event.

By way of another example, the user interface 112 may be used by the user to provide inputs to the password creation device 102. Thus, for example, in some embodiment, the user may ingest an input via the password creation device 102 that may include the user selection of each of the associated image from each of the plurality of second sets of images. In another embodiment, the user may ingest input via the password creation device 102 that may include the user selection of the one or more keywords from each of the plurality of sets of keywords. Further, for example, in some embodiments, the password creation device 102 may render intermediate results (e.g., the relevant event, the first set of images, the set of preliminary information associated, the plurality of second sets of images, the plurality of sets of keywords) or final results (e.g., the generated password) to the user via the user interface 112.

The memory 106 may store instructions that, when executed by the processor 108, may cause the processor 108 to generate password based on images captured by the user. As will be described in greater detail in conjunction with FIG. 2 to FIG. 11, in order to generate the password, the processor 108 in conjunction with the memory 106 may perform various functions including identification of the relevant event from the plurality of events associated with the user, determination of the set of preliminary information associated with the relevant event and the first set of images, creation of the plurality of second sets of images, presentation of the plurality of second sets of images to the user, receiving from the user, the user selection of the associated image, etc.

The memory 106 may also store various data (e.g., the set of preliminary information associated with the relevant event, the relevant event, the first set of images, the plurality of second sets of images created, the user selection of the associated images, the predefined criteria, the user selection of the one or more keywords, etc.,) that may be captured, processed, and/or required by the electronic device 102. The memory 106, in some embodiments, may also include the ML model 104. The memory 106 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random-Access Memory (DRAM), Static Random-Access memory (SRAM), etc.).

Further, the password creation device 102 may interact with a server 114 or user devices 120 over a network 118 for sending and receiving various data. The user devices 120 may be used by a plurality of users to provide their selection for the first set of images to the password creation device 102. In addition, the user devices 120 may be used by the plurality of customers to provide response for the plurality of second sets of images and the plurality of sets of keywords. Examples of the user devices 122 may include, but is not limited to, computer, tablet, mobile, and laptop. The network 118, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In some embodiment, the password creation device 102 may fetch each of the plurality of second sets of images and each of the plurality of sets of keywords from the server 114. In addition, the server 114 may provide access of information (i.e., the plurality of second sets of images and the plurality of sets of keywords) associated with each of the relevant event. The server 114 may further include a database 116. The database 116 may store images and keywords. By way of an example, the database 116 may store the information associated with the plurality of events in order to identify the relevant event associated with the user. The database 116 may be periodically updated with new information available for new events.

Further, a database 122 connected to the network 118 may be used to store the predefined criteria, the first set of images, the relevant event identified, the set of preliminary information associated with the relevant event, the user selection of each of the plurality of second sets of images, the user selection of each of the plurality of sets of keywords, etc. In addition, the database 114 may store the chronological order of each of the associated image selected by the user from each of the plurality of second sets of images. Additionally, the database 114 may be periodically updated based on occurrence of a new relevant event.

Figure 2:
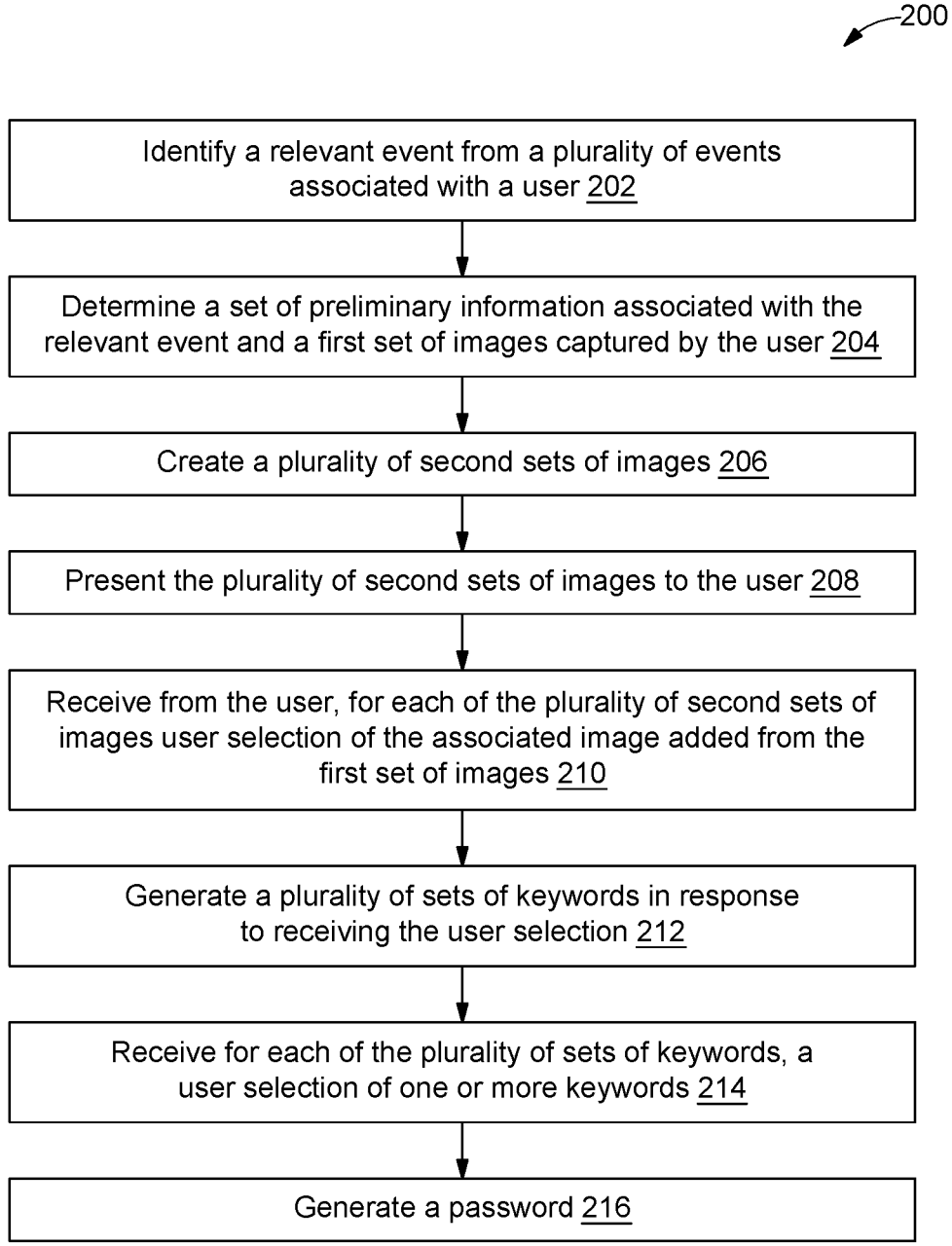
FIG. 2 illustrates a flowchart of a method for generating password based on images captured by a user, in accordance with an embodiment.

Referring now to FIG. 2, a flowchart of a method 200 for generating password based on images captured by a user is illustrated, in accordance with an embodiment. At step 202, a relevant event from a plurality of events associated with a user may be identified. The relevant event may correspond to a meaningful event that may have happened in life of the user. In an embodiment, the relevant event may be determined based on predefined criteria. The predefined criteria may include a plurality of factors. The plurality of factors may include, but is not limited to event duration, location of the user, people in vicinity of the user, deviation in at least one of the actions based on predefined actions associated with the user, and user confirmation of relevancy of the relevant event.

Once the relevant event is identified, at step 204, a set of preliminary information associated with the relevant event and a first set of images captured by the user during the relevant event may be determined. In an embodiment, the set of preliminary information associated with the relevant event may include, but is not limited to, date and time of each of the first set of images, last minute of the relevant event, duration of the relevant event, location of the relevant event, weather during occurrence of the relevant event, and verification of people in the vicinity of the user present during occurrence of the relevant event.

For example, the last minute of the relevant event may include time in minutes for which the relevant event may last lasted. The duration of the relevant event may include number of days of occurrence of the relevant event and hours of occurrence of the relevant event in each of the number. Further, the location of the relevant event may provide correct location information including general information (e.g., city, seaside, a park, countryside, a mountain, an island, etc.,) and detailed information (i.e., name of specific city, country, name of specific place, such as, church, restaurant, museum, stadium, house, monument, etc.,) of occurrence of the relevant event. By way of an example, consider the set of preliminary information associated with the relevant event may include date as '23. May. 2021', 'time as 10:30 a.m.', last of the relevant event as '1.5 hours', location general information as 'Italy and Rome', and location specific information as 'Church Santa Costanza via Nomentana, 349', weather as 'rainy', and verification of people as 'greater than 50'.

Further, in order to determine the first set of images, the user may select images associated with the relevant event until a number of images required for generating a complex password are selected by the user. Once the set of preliminary information and the first of images associated with the relevant event is determined, at step 206, a plurality of second sets of images may be created. In an embodiment, each of the plurality of second sets of images may include an image from the first set of images and at least one similar image. Moreover, in order to create each of the plurality of second sets of images, at least one feature of each of the at least one similar image may match with corresponding feature of the image from first set of images. A method of selecting at least one similar image associated with the image selected from the first set of images has been explained in greater detail in conjunction with FIG. 4.

Once each of the plurality of second sets of images are created, at step 208, each of the plurality of second sets of images may be presented to the user. Upon presenting, each of the plurality of second sets of images to the user, at step 210, a user selection of the associated image may be received. The associated image may correspond to an image added from the first set of images to each of the plurality of second sets of images. Upon receiving the user selection of each of the associated image from each of the plurality of second sets of images, at step 212, a plurality of sets of keywords may be generated in response to receiving the user selection.

In an embodiment, each of the plurality of sets of keywords may be generated for the image selected by the user from an associated second set of images. Moreover, each of the plurality of sets of keywords may be generated based on the set of preliminary information associated with the relevant event, the image selected by the user, images similar to the images selected by the user, and at least one predefined rule. In an embodiment, the images similar to the images selected by the user may correspond to one or more of the first set of images. In continuation to the above example described in the step 204, for the set of preliminary information, the set of keywords generated for each of the associated second set of images may include 'Rome, Italy, morning, Santa Costanza, marriage, Marco, Chiara, Rainy, 23. May. 2021. A method for generating each of the plurality of keywords has been explained in greater detail in conjunction with FIG. 6.

Once the plurality of sets of keywords are generated, at step 214, a user selection of one or more keywords from each of the plurality of sets of keywords may be received. Upon receiving the user selection of the associated image and the one or more keywords from each of the plurality of sets of keywords generated for the associated image, at step 216, a password may be generated. In other words, the password may be generated based on the one or more keywords selected by the user for each of the plurality of sets of keywords and associated images selected by the user for each of the plurality of second sets of images.

Figure 3:
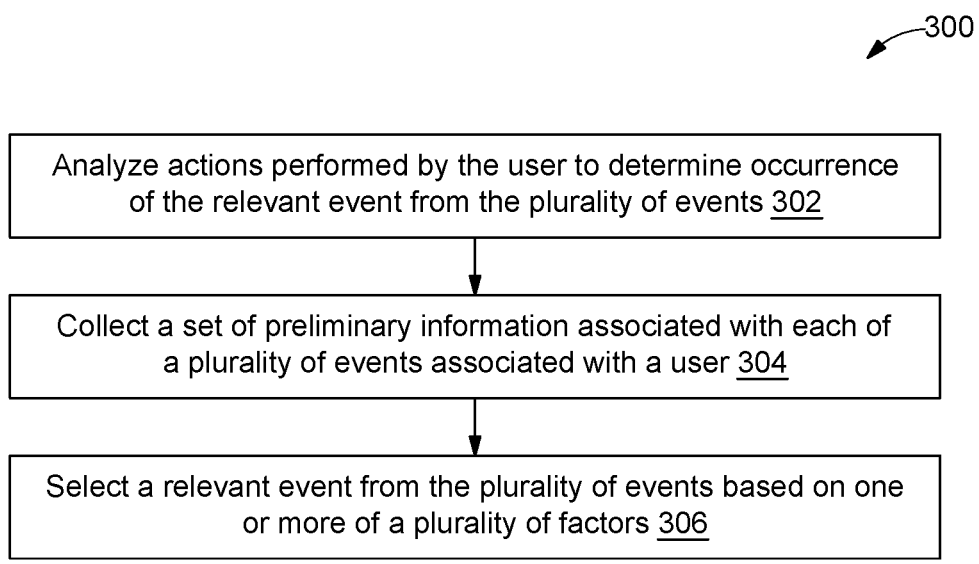
FIG. 3 illustrates a flowchart of a method for selecting relevant event from a plurality of events associated with a user, in accordance with an embodiment.

Referring now to FIG. 3, a flowchart of a method 300 for selecting relevant event from a plurality of events associated with a user is illustrated, in accordance with an embodiment. In reference to FIG. 2, as mentioned at step 202, in order to identify the relevant event, at step 302, action performed by the user may be analyzed to determine occurrence of the relevant event from the plurality of events. By way of an example, in order identify the relevant event, everyday behavior (i.e., the actions) of the user may be monitored. The everyday behavior of the user may be monitored to determine whether a meaningful event, i.e., the relevant event, has occurred in life of the user. In order to determine whether an event occurred is the meaningful event, user's standard behavioral pattern associated with a fact that the user is taking photos (images) may be monitored. Further, in addition to monitoring of the user's standard behavioral pattern, a confirmation may be taken form user to confirm occurrence of the meaning event when the user takes the photos in a place or time different from his habits.

Based on analysis of the actions performed by the user, at step 304, a set of preliminary information associated with each of the plurality of events may be collected. In an embodiment, each of the plurality of events may be associated with the user. In addition, the set of preliminary information may include, but is not limited to, date and time of each of the first set of images, last minute of the relevant event, duration of the relevant event, location of the relevant event, weather during occurrence of the relevant event, and verification of people in the vicinity of the user present during occurrence of the relevant event. Further, each of the set of preliminary information associated with the plurality of events happening in user's life may be analyzed to identify the relevant event.

For example, in order to perform the verification of people in the vicinity of the user, a request may be broadcasted to retrieve information of the people present in the vicinity of the user during occurrence of the relevant event. In an embodiment, the request to retrieve the information may be leveraged using Bluetooth. The broadcasted request may be received by other users on their device. In an embodiment, the device associated with each of the people may correspond an electronic device. In other words, a password creation application may be installed in an electronic device of each of the people. Examples of the electronic device may include, but is not limited to, a mobile, a tablet, a laptop, and a desktop. In one embodiment, the electronic device may correspond to the password creation device 102. In another embodiment, the electronic device may correspond to the user device 120. Moreover, due to limited range of the Bluetooth, the broadcasted request might be repeated over time. As will be appreciated, other communication methods with a wider range might be used to retrieve the information associated with the people. In an embodiment, purpose of verification of the people is to retrieve type of the people present in the vicinity of user in an anonymous way.

Further, in order to perform the verification, the people present in the vicinity of the user during occurrence of the event may reply with a token via their devices. In reference to FIG. 1, the generated token may be sent to the server 114. It should be noted that, at end of a day the server 114 may delete the token associated with each of the people in order not to maintain any piece of information related to the people. Further, the password creation device 102 of the user may process the token by sending a request for processing to the server 114.

Upon processing the request, the server 114 may reply with one of a three possible answers. The three possible answers may include a friend, an unknown person, and a famous person. In an embodiment, every person who is part of any of a user's social network (e.g., Facebook, LinkedIn, Twitter and so on) may be classified as the friend. Further, more grades may be adopted to perform classification of person such as family member, colleague, and acquittance. In order to perform the classification each of the people present in the vicinity of the user, the user may be required to grant permission of his social circle to the server 114. Once the verification and the classification or the people is performed, no sensitive information related to the people may be collected and stored in the password creation device 102 of the user.

In another embodiment, the verification of the people in the vicinity of the user may be done only to identify whether the relevant event occurred is a public event or a private event. The identification of whether the relevant is the public event or the private event may be done based on a number of people present in the vicinity of the user during occurrence of the event. In an embodiment, the relevant event may be determined to be the public event, or the private event based on a predefined threshold. By way of an example, suppose the predefined threshold may be set to 20. Hence, upon identify the number of people present in the vicinity of the user during the occurrence of the relevant event to be above then the predefined threshold, say 30, then the relevant event may be classified as the public event.

Further, based on analysis of the user actions and the set of preliminary information collected for the plurality of events, at step 306, the relevant event from the plurality of events may be selected. In an embodiment, the relevant event may be selected based on one or more of a plurality of factors. The plurality of factors may include, but is not limited to event duration, location of the user, people in vicinity of the user, deviation in at least one of the actions based on predefined actions associated with the user, and user confirmation of relevancy of the relevant event.

Figure 4:
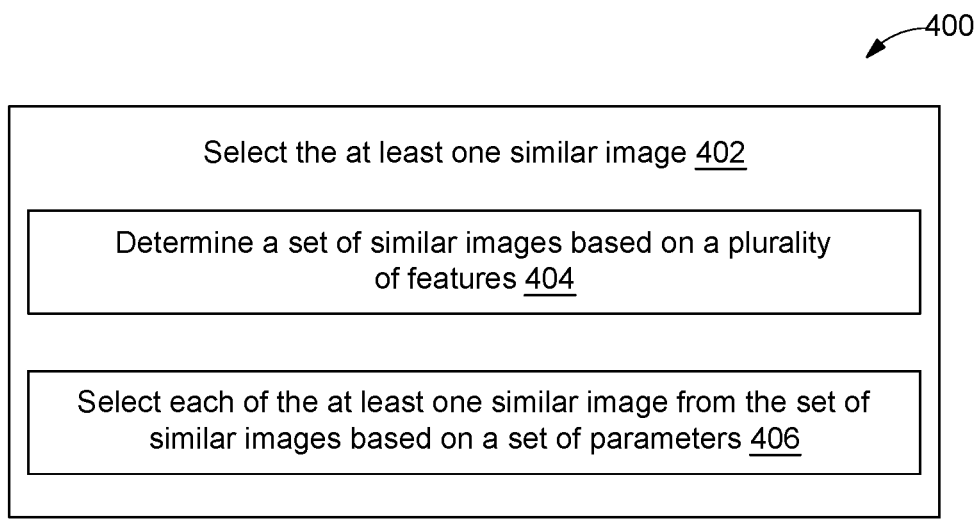
FIG. 4 illustrates a flowchart of a method for selecting at least one image corresponding to each of a first set of images, in accordance with an embodiment.

Referring now to FIG. 4, a method 400 for selecting at least one similar image corresponding to each of a first set of images is illustrated, in accordance with an embodiment. In reference to FIG. 2, as mentioned in step 206 in order to create the plurality of second sets of images, at step 402, the at least one similar image may be selected corresponding to each image of the first set of images. In other words, each of the plurality of second set of images may include an image selected from the first set of images and the at least one similar image selected corresponding to the image of the first set of images. In order to create each of the plurality of second sets of images, at step 404, a set of similar images corresponding to each of the first set of images may be determined based on a plurality of features.

In an embodiment, each of the set of similar images may be selected based on matching of the at least one feature of each of the set of similar images with the corresponding feature of at least one of the image selected from the first set of images. The plurality of features may include at least one of an entity present in each of the set of similar images, background of each of the set of similar images, landscape of each of the set of similar images, environmental objects present in each of the set of similar images, climate in each of the set of similar images, or context of each of the set of similar images. Moreover, each of the set of similar images may not be captured by the user. Once each of the set of similar images are determined, at step 406, each of the at least one similar image from the set of similar images may be selected based on a set of parameters. In an embodiment, the set of parameters may include size, focus, sharpness, pixel clarity, and brightness. In reference to FIG. 1, the selection of the at least one similar image may be done using the ML model 104.

Figure 5:
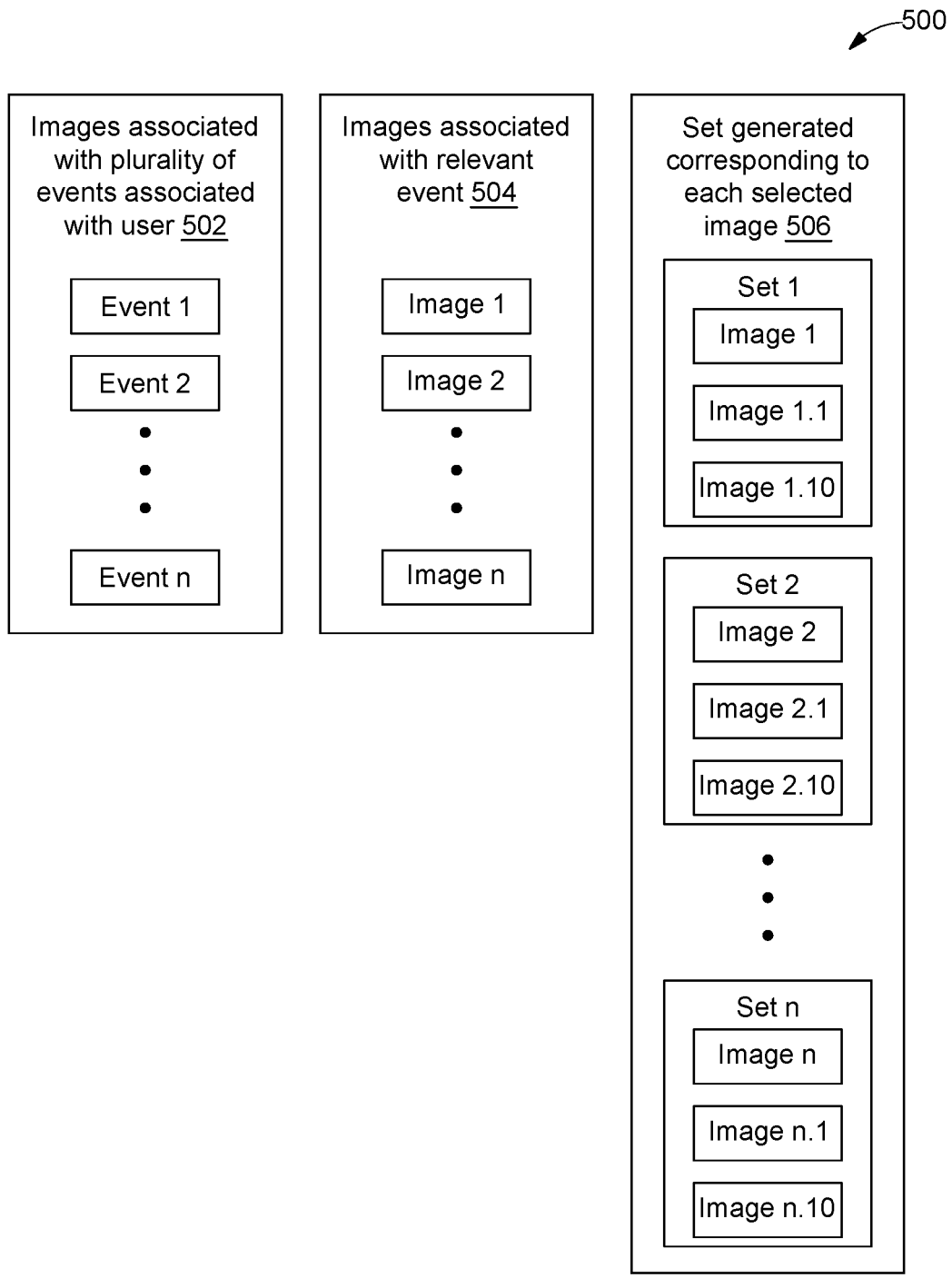
FIG. 5 represents a logical structure framework for receiving a user selection for an associated image from each of a plurality of second set of images, added from a first set of images, in accordance with an exemplary embodiment.

Referring now to FIG. 5, a logical structure framework 500 for receiving a user selection for an associated image from each of a plurality of second set of images, added from a first set of images is represented, in accordance with an exemplary embodiment. Initially, at step 502, images associated with the plurality of events associated with the users may be captured. As depicted at step 502, the plurality of events may be depicted as 'event 1', 'event 2', up to 'event n'. In other words, the plurality of events occurred in the user's life may be 'n'. By way of an example, when a value of 'n' may be '10', then, the plurality of events occurred in the user's life may be '10'. Further, the set of preliminary information associated with each of the plurality of events may be collected. Upon collecting the set of preliminary information for each event associated with the user, each of the set of preliminary information may be analyzed to identify the relevant event. The relevant event may correspond to the meaningful event occurred in the user's life.

Once the relevant event is identified from the plurality of events, then at step 504, a subset of images may be selected from a plurality of images associated with the relevant event. In an embodiment, the subset of images may correspond to the first set of images. By way of an example, considering if the plurality of events associated with the user are '10', and 'event 1' is identified to be the relevant, then as depicted by the step 504, 'image 1', 'image 2' up to 'image n' may be part of the first set of images associated with 'the event 1'. In this example, a value 'n' depicting the total number of images in the first set of images may be considered to be '10'.

Once the first set of images are selected, at step 506, a set of similar images may be generated corresponding to each of the first set of images. In an embodiment, each of the set of similar images may correspond to one of the plurality of second set of images. Further, each of the set of similar images may include an image from the first set of images and at least one similar image. Moreover, the at least one similar image may be selected based on matching of the at least one feature of each of the set of similar images with the corresponding feature of at least one of the image selected from the first set of images. In addition, each of the at least one similar image may be selected based on the set of parameters. The set of parameters may be include, but is not limited to, size, focus, sharpness, pixel clarity, and brightness.

As described in the example of the step 504, when the first set of images including 'image 1', 'image 2', up to 'image n', i.e., 'image 10' are identified, then as depicted via the step 506, the set of similar images may be generated corresponding to each of the first set of images. By way of an example, ten sets of similar images may be generated as the first set of images includes ten images. As depicted via the step 506, 'set 1' may correspond to a first set of similar images. The first set of similar images may be generated corresponding to first image, i.e., 'image 1', from the first set of images. The first set of similar images may include ten images from which one image may be the 'image 1' and other nine images, i.e., 'image 1.1', 'image 1.2' up to 'image 1.10' may be images similar to the 'image 1'. Similarly, 'set 2' may correspond to a second set of similar images. The second set of similar images may be generated corresponding to second image, i.e., 'image 2' of the first set of images. The second set of similar images may include ten images from which one image may be the 'image 2' and other nine images, i.e., 'image 2.1', 'image 2.2', up to 'image 2.10' may be images similar to the 'image 2'.

Likewise, 'set n' may correspond to a tenth set of similar images. The tenth set of similar images may be generated corresponding to tenth image, i.e., 'image n' of the first set of images. The tenth set of similar images may include ten images from which one image may be the 'image n' and other nine images, i.e., 'image n.1', 'image n.2', up to 'image n.10' may be images similar to the 'image 2'. As will be appreciated number of the sets of similar images may vary based on images present in the first set of images.

Figure 6:
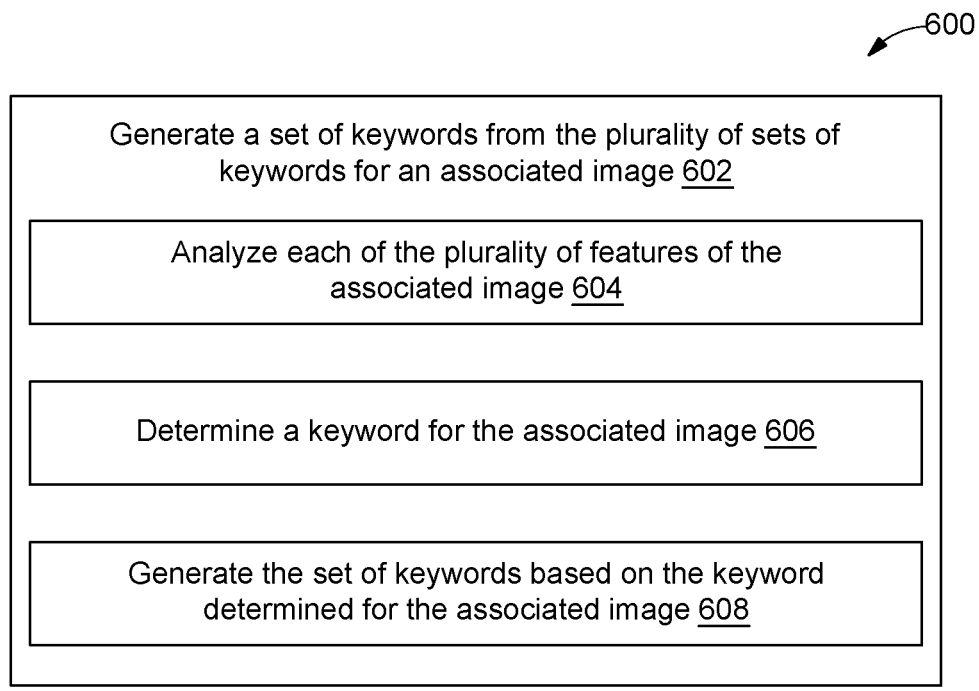
FIG. 6 illustrates a flowchart of a method for generating a set of keywords for each of an associated image, in accordance with an embodiment.

Referring now to FIG. 6, a flowchart of a method 600 for generating a set of keywords for each of an associated image is illustrated, in accordance with an embodiment. In reference to FIG. 2, as mentioned in step 212, a plurality of sets of keywords may be generated in response to receiving the user selection of the associated image from each of the plurality of second sets of images. At step 602, a set of keywords from the plurality of sets of keywords may be generated corresponding to an associated image. The associated image may correspond to an image added from the first set of images to one of the plurality of second set of images for which the user selection may have received. In some embodiment, keywords associated with each of the first set of images may be utilized for generating the set of keywords for the associated image selected from the associated second set of images. In other words, in order to generate the set of keywords for the associated images all the keywords related to images of the relevant event may be used for the associated image selected from the associated second set of images.

Further, in order to generate the set of keywords, at step 604, each of the plurality of features of the associated image may be analyzed. The analysis of each of the plurality of features of the associated image may be done based on the set of preliminary information associated with the relevant event, the associated image, and the at least one pre-defined rule. In reference to FIG. 1, the analysis of the associated image may be done using the ML model 104. The plurality of features may include at least one of an entity present in each of the set of similar images, background of each of the set of similar images, landscape of each of the set of similar images, environmental objects present in each of the set of similar images, climate in each of the set of similar images, or context of each of the set of similar images.

Further, at step 606, a keyword may be determined for the associated image based on analysis of the plurality of features of the associated image and each of the first set of images captured by the user. Upon determining the keyword, at step 608, the set of keywords may be generated based on the keyword determined for the associated image. In an embodiment, the set of keywords may include alternative keywords in correspondence to the determined keyword. In an embodiment, the keyword may be determined using the ML model 104.

As will be appreciated, the ML model 104 may be initially trained based on a labelled dataset of images to identify occurrence of the relevant event. The labelled dataset of images may include a plurality of images of a plurality of events such as ceremony (e.g., marriage, retirement party, award ceremony, farewell, etc.), sport events (e.g., a soccer match, a football match, a tennis match, a cricket match, etc.), a birthday, a party, a trip, a holiday, and leisure time. Further, in the labelled dataset of images each of the plurality of images of the plurality of events may be labelled with an associated keyword. In an embodiment, each of the plurality of images of the plurality of events may represent the relevant event. Based on the labelled dataset of images, the ML model 104 may be iteratively trained to identify the relevant event and determine the associated keyword for each of the plurality of images of the relevant event. Further, based on training of the ML model 104, the ML model 104 may be configured to identify the relevant event and determine the keyword for the associated image of the relevant event.

In addition to training of the ML model 104 for identification of the relevant event and determination of the keyword for the associated image of the relevant event, the ML model 104 may also be trained to predict the set of preliminary information associated with the relevant events. By way of an example, the ML model 104 may predict location of the relevant event, e.g., seaside, mountains, city, etc. Further, upon identifying the relevant event from the plurality of events and determination of the set of preliminary information, the ML model 104 may be configured to generate the set of keywords corresponding to each of the image selected for the relevant event. By way of example, in case marriage is identified as the relevant event and location of the relevant event is determined to be of city, then the set of keywords may include event type, i.e., marriage and name of city, e.g., Rome.

By way of an example, in order to consider name of people to be the keyword associated with the image added from the first set of images, a facial recognition algorithm may be used to identify each of the people present in the vicinity of the user during the occurrence of the relevant event. By using the facial recognition algorithm, face of each person present in the vicinity of the user in the associated image may be analyzed. In order to analyze face of each person, face of each person present in the vicinity of user may be compared with contacts present in a user device, people present in social networks of the user, and with public information available online. In reference to FIG. 1, the user device may correspond to the user device 120. Upon identifying a match of at least one person, name of the at least one person may be determined to the keyword associated with the image. In an embodiment, name of each of the at least one person may be ranked based on number of occurrences of each of the at least one person in the relevant event. It should be noted that, name of the at least one person with a higher rank may be chosen as the keyword to be suggested to the user.

Upon determining the keyword, the ML model 104 may generate alternative keywords corresponding to the keyword. The alternative keywords may correspond to keywords that are relevant to the keyword but may have different meaning. In other words, the alternative keywords may be synonyms of the determined keyword. As will be appreciated for ease of explanation, generation of the set of keywords for one image is explained. However, based on the method 600 described above, the set of keywords may be generated for each of the associated image added from the first set of images in response to receiving the user selection for the associated image from each of the plurality of second sets of keywords.

Figure 7:
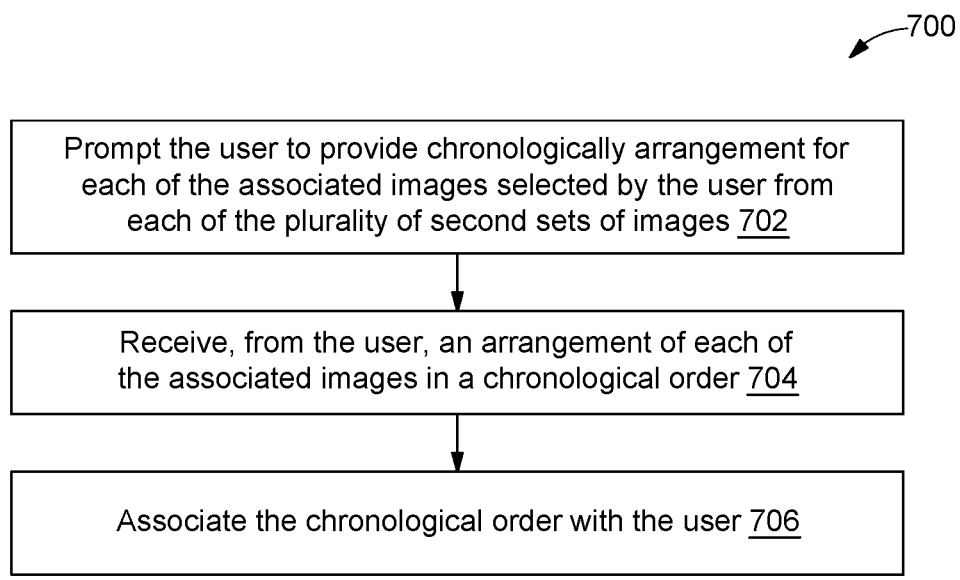
FIG. 7 illustrates a flowchart of a method for receiving a chronological order from a user for each of an associated image, in accordance with an embodiment.

Referring now to FIG. 7, a flowchart of a method 700 for receiving a chronological order from a user for each of an associated image is illustrated, in accordance with an embodiment. In reference to FIG. 2, as mentioned in step 210, the user selection of the associated image added from the first set of images may be received, for each of the plurality of second sets of images. In addition to receiving the user selection of the associated image, an addition layer of security may be added by prompting the user to arrange each of the associated image in the chronological order.

In order to add the additional layer of security, at step 702, the user may be prompted to provide chronological arrangement for each of the associated image selected by the user from each of the plurality of second sets of images. Upon prompting the user, at step 704, an arrangement of each of the associated image may be received in the chronological order. By way of an example, the chronological order may correspond to the arrangement of each of the associated image selected by the user based on time of taking the associated image. Once the arrangement of each of the associated image in the chronological order is received from the user, at step 706, the chronological order of each of the associated image may be associated with the user. Moreover, the chronological order associated with the user may be used while providing access of a password protected application to the user. This has been further explained in conjunction with FIG. 9 and FIG. 10.

Figure 8:
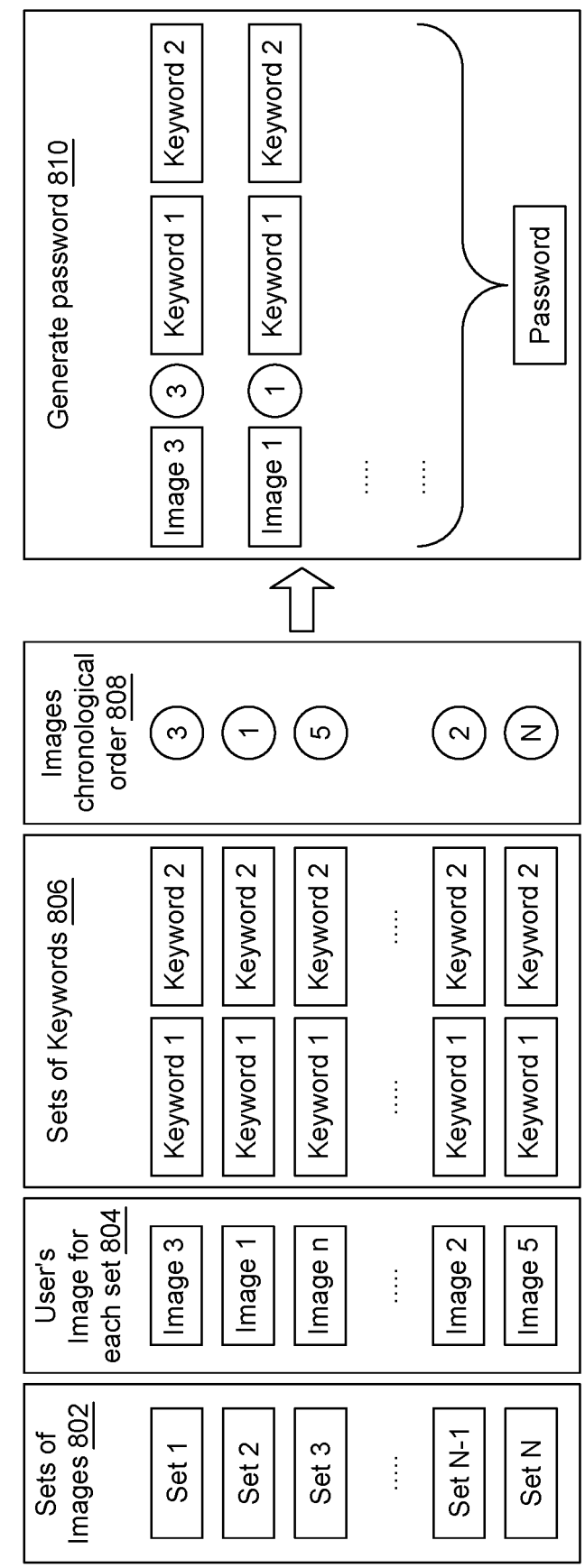
FIG. 8 represents a logical structure framework for generating a password, in accordance with an embodiment.

Referring now to FIG. 8, a logical structure framework 800 for generating a password is represented, in accordance with an exemplary embodiment. At step 802, a plurality of sets of images may be created. In reference to FIG. 2, the plurality of sets of images may correspond to the plurality of second sets of images. In an embodiment, each of the plurality of sets of images may include an image from the first set of images and other similar images. The method for creating the plurality of sets of images has already been explained in reference to FIG. 5. As depicted via step 802, the plurality of sets of images may correspond to 'set 1', 'set 2', 'set 3', up to 'set n'. By way of an example, suppose the first set of images may include ten images corresponding to the relevant event associated with the user. Then, a value for 'set n' may correspond to 'set 10'. In other words, the plurality of sets of images may correspond to ten sets of images, i.e., for each image of the first set of images a set of similar images may be generated.

The set of similar images created may include the image from the first set of images and other similar nine images considering that each of the set of similar images includes ten images. Moreover, the other similar nine images may be selected based on matching of the at least one feature of the other nine images with the corresponding feature of the image selected from the first set of images. For example, the 'set 1' may include ten images from which one image may be the image selected from the first set of images and other nine images may be similar to the image added from the first set of images in the 'set 1'. Similarly, ten sets may be created corresponding to each of the plurality of sets of images.

Further, each of the plurality of sets of images created in the step 802 may be presented to the user. Upon presenting, the user may provide his selection (i.e., the user selection)

for each of the image added from the first set of images for each of the plurality of sets of images created. As depicted via step 804, the user selection is represented for each of the image selected from each of the plurality of sets of images. The image selected by the user may be the image added from the first set of images. By way of an example, for the 'set 1' the user selection of the image from the 'set 1' may correspond to an 'image 3'. Similarly, for the 'set 2' the user selection of the image from the 'set 2' may correspond to an Image 1'. Further, the user selection of the image from the 'set 3' may correspond to an Image n', i.e., Image 10', since each of the plurality of sets of images includes ten images. Likewise, the user selection of the image may be received for each of the plurality of sets of images. For example, the user selection of the image from the 'set 9', i.e., 'set N–1' may correspond to an 'image 2'. Further, for last set of images, i.e., the 'set 10' ('set N'), the user selection of the image from the 'set 10' may correspond to the 'image 5'.

Upon receiving the user selection of the image for each of the plurality of sets of images, at step 806, a plurality of sets of keywords in response to receiving the user selection of the image from each of the plurality of sets of images. As depicted via the step 806, each of the plurality of sets of keywords may include 'keyword 1' and 'keyword 2'. In other words, a set of keywords may be generated for each image selected by the user as depicted via the step 804. By way of an example, the set of keywords generated for the 'image 3' selected by the user from the 'set 1' may include 'keyword 1' and 'keyword 2'. Similarly, for each of the image selected by the user a set of keywords may be generated. The method of generating the set of keywords for the associated image has been already explained in detail in reference to FIG. 6.

Once the set of keywords correspond to each of the image are generated, then each of the plurality of sets of keywords generated may be rendered to the user for receiving the user selection of the one or more keywords from each of the plurality of sets of keywords. Further, at step 808, the user may be prompted to provide the chronological arrangement of each image selected (depicted via the step 806) from the plurality of sets of images. The method of prompting the user for providing the chronological arrangement for each of the selected image has already been explained in conjunction with FIG. 7. Upon receiving the chronological arrangement of the selected images from the user, at step 810, the password may be generated based on the one or more keywords selected by the user for each of the plurality of sets of keywords and the images selected by the user for each of the plurality of sets of images. Moreover, for generating the password the chronological arrangement provided by the user may also be considered.

Figure 9:
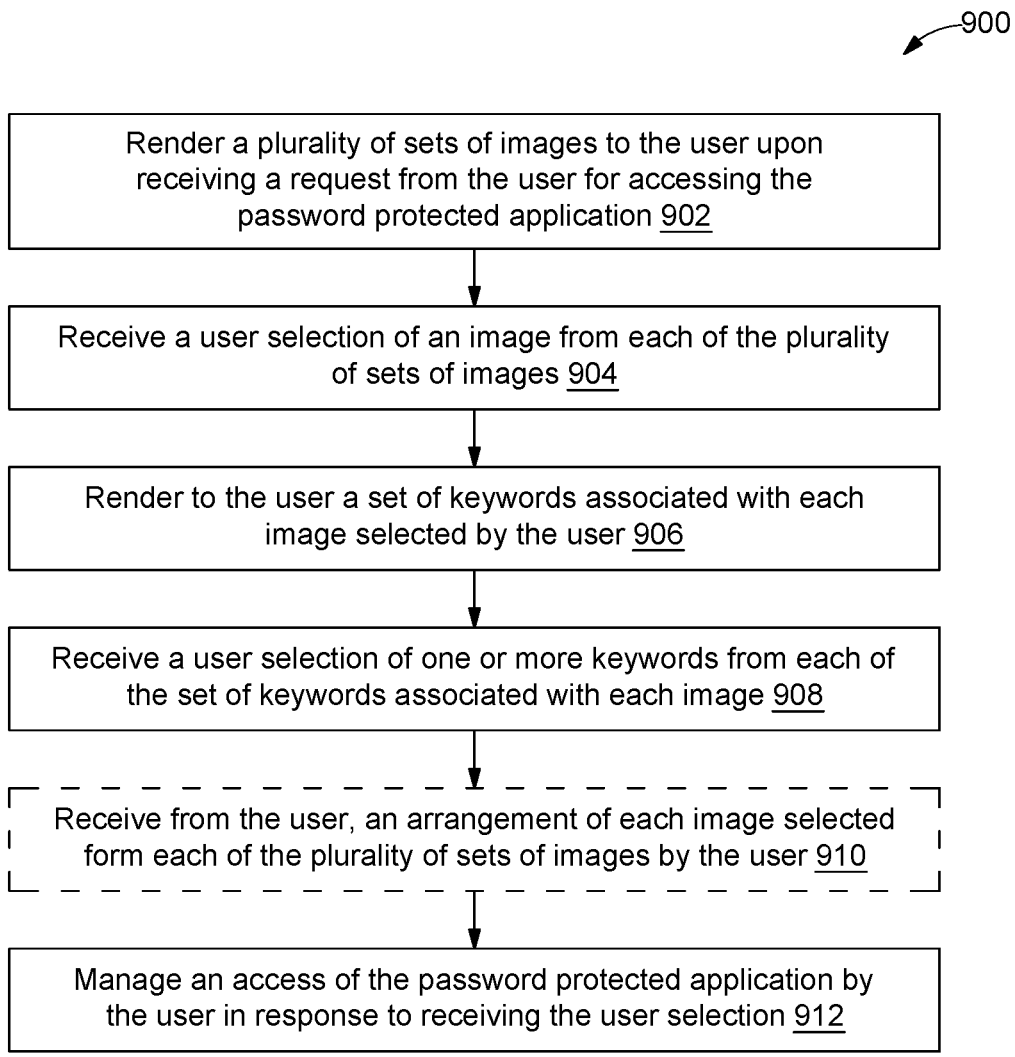
FIG. 9 illustrates a flowchart of a method for providing access of a password protected application to a user, in accordance with an embodiment.

Referring now to FIG. 9, a flowchart of method 900 for providing access of a password protected application to a user is illustrated, in accordance with an embodiment. Initially, the user may generate a request for accessing the password protected application. As will be appreciated, the password protected application may be installed on an electronic device of the user. Examples of the electronic device may include, but is not limited to, mobile, laptop, desktop, and tablet. Further, in order to provide access of the password protected application to the user, at step 902, a plurality of sets of images may be rendered to the user upon receiving the request from the user.

Once the plurality of sets of images are rendered to the user, at step 904, a user selection of an image from each of the plurality of sets of images may be received. In an embodiment, each image selected by the user may corresponds to an image captured by the user during a relevant event. In reference to above FIGS. 1 to 8, the relevant event may correspond to the relevant event used for generating the password. In addition, each image selected by the user may correspond to the image present in the first set of images.

Upon receiving the user selection of the image from each of the plurality of sets of images, at step 906, a set of keywords associated with each image selected by the user may be rendered to the user. Once each of the set of keywords are rendered to the user, at step 908, a user selection of one or more keywords may be received for each of the set of keywords associated with each image. Upon receiving the user selection of the one or more keywords from each of the sets of keywords, the user may be prompted to provide an arrangement of each image selected form each of the plurality of sets of images by the user.

Upon prompting the user, at step 910, the arrangement may be received from the user for each image selected by the user form each of the plurality of sets of images. In an embodiment, the arrangement may correspond to a predefined chronological order. The predefined chronological order may correspond to the chronological order received from the user, of each of the associated image selected from the first sets of images while generating the password. By way of an example, the user may be prompted to arrange each image selected form each of the plurality of sets of images based on date of capturing of each image. An advantage of prompting the user is to add an extra layer of security to the password protected application.

Further, at step 912, an access of the password protected application may be managed in response to receiving the user selection of each image and the one or more keywords. In other words, based on the user selection received for each image and the one or more keywords, the access of the password protected application may be provided to user. In addition to receiving the user selection, the access of the password protected application may be provided to the user based on the arrangement received of each image selected from the plurality of sets of images in the predefined chronological order. A method of managing the access of the password protected application has been explained in greater detail in conjunction with FIG. 10.

Figure 10:
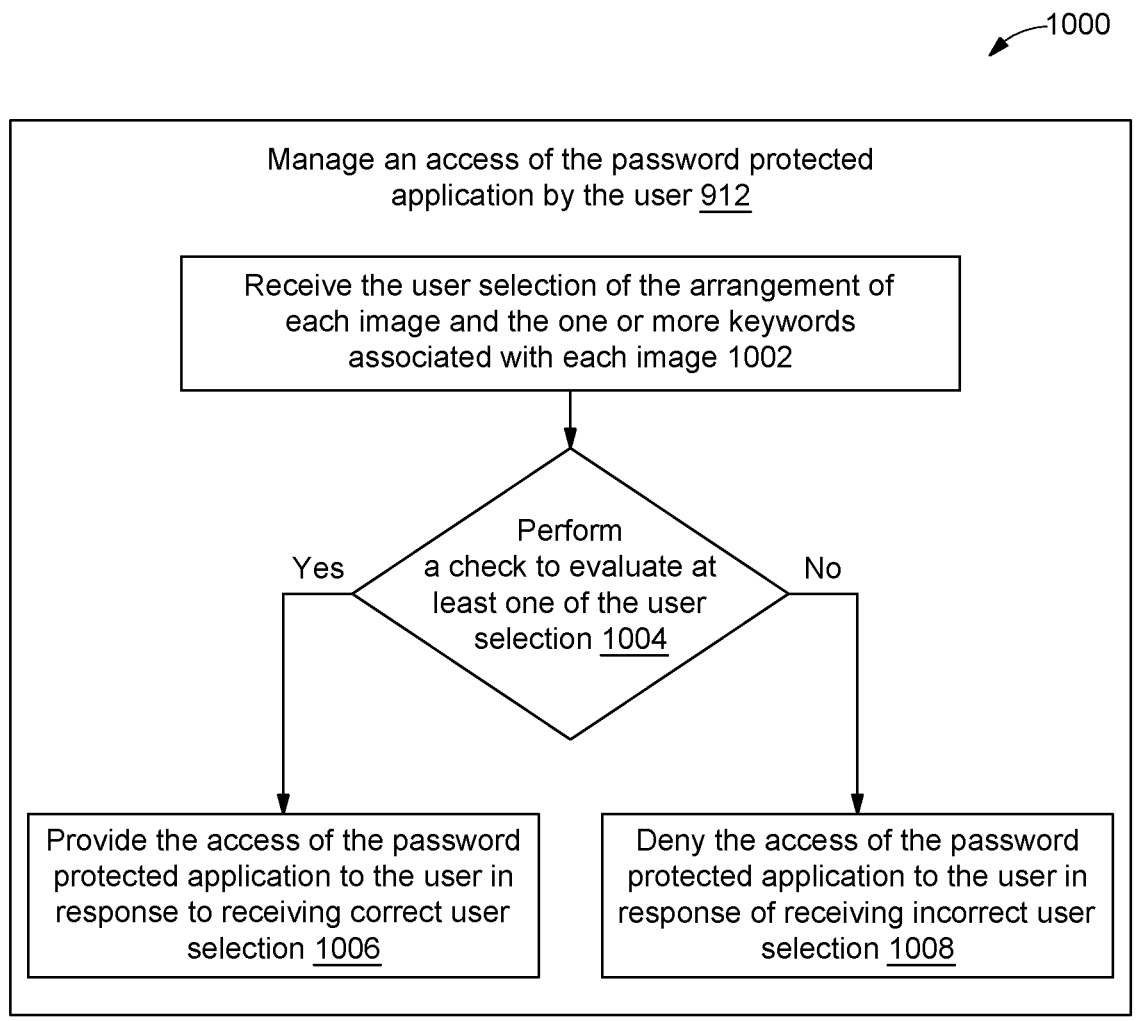
FIG. 10 illustrates a flowchart of a method for managing access of an access of a password protect application, in accordance with an embodiment.

Referring now to FIG. 10, a flowchart of method 1000 for managing access of an access of a password protect application is illustrated, in accordance with an embodiment. In reference to FIG. 9, as mentioned via the step 912, in order to manage the access of the password protected application, at step 1002, the user selection of the arrangement of each image selected and the one or more keywords may be received. Upon receiving the user selection, at step 1004, a check may be performed to evaluate at least one of the user selection of the arrangement of each image selected from the plurality of sets of images and the one or more keywords associated with each image.

In one embodiment, based on the check performed, upon identifying the user selection to be correct, at step 1006, the access of the password protected application may be provided to the user in response to receiving correct user selection of the arrangement of each image and the one or more keywords associated with each image. In another embodiment, based on the check performed, upon identifying the user selection to be incorrect, at step 1008, the access of the password protected application may be denied to the user in response of receiving incorrect user selection of at least one of the arrangement of each image and the one or more keywords associated with each image.

Figure 11:
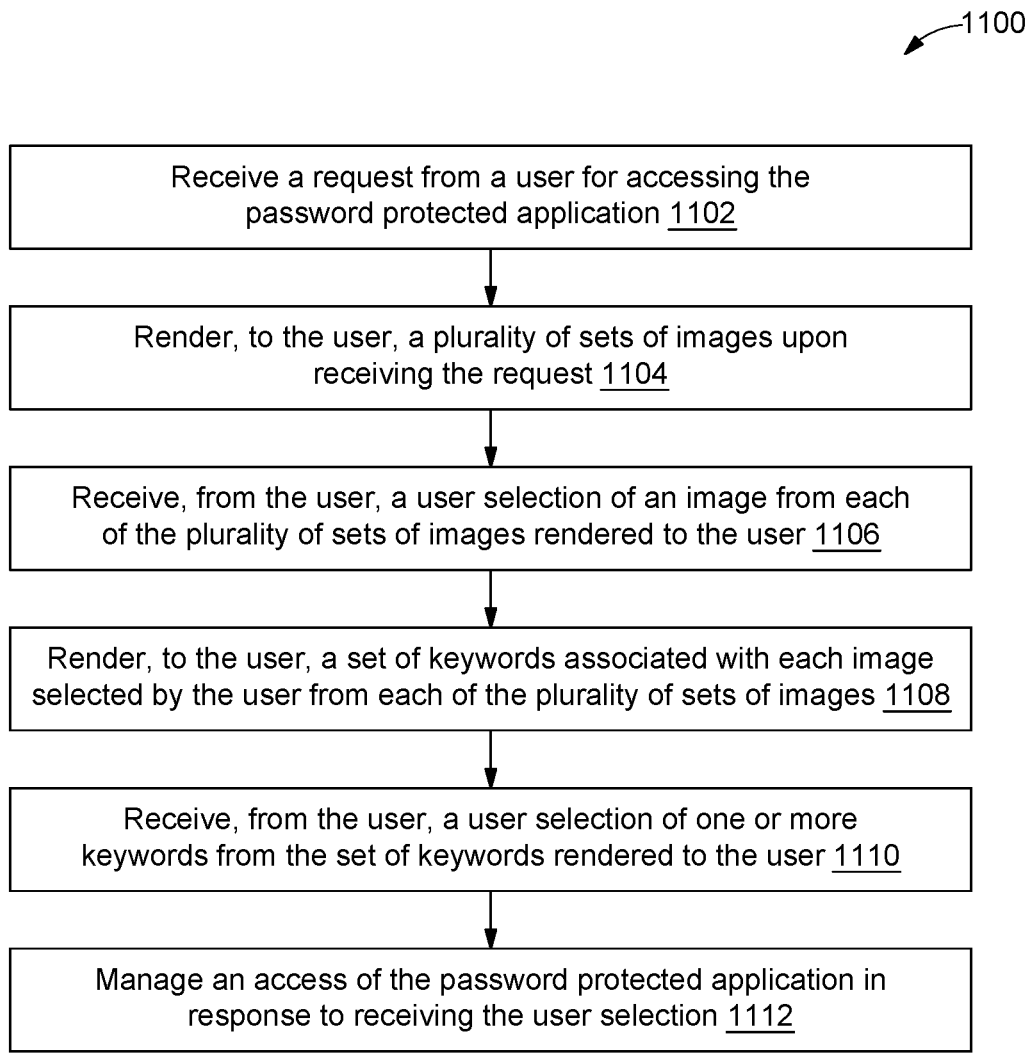
FIG. 11 illustrates a logical flow executed by a graphical user interface (GUI) client configured for managing user access to a password protected applications, in accordance with an embodiment.

Referring now to FIG. 11, a logical flow 1100 executed by a graphical user interface (GUI) client configured for managing user access to a password protected applications is illustrated, in accordance with an embodiment. In order to manage user access to the password protected application, at step 1102, a request may be received from a user for accessing the password protected application. Upon receiving the request, at step 1104, a plurality of sets of images may be rendered to the user. Further, at step 1106, a user selection may be received of an image from each of the plurality of sets of images rendered to the user. In reference to above FIG. 2, the image selected from each of the plurality of sets of images may correspond to the image added from the first set of images while generating the password.

Once the user selection of the image from each of the plurality of sets of images is received, at step 1108, a set of keywords associated with each image selected by the user from each of the plurality of sets of images may be rendered to user. Further, at step 1110, a user selection may be received of one or more keywords for each of the set of keywords rendered to the user. In addition to receiving the user selection of the one or more keywords, the user may be prompted to provide an arrangement of each image selected from each of the plurality of sets of images and the one or more keywords selected from each of the plurality of sets of keywords generated for each image. In an embodiment, the arrangement may correspond to the predefined chronological order associated with the user. Further, at step 1112, an access of the password protected application by the user may be managed in response to receiving the user selection. The method of managing the access of the password protected application has already been explained in reference to FIG. 10.

Various embodiments provide method and system for generating password based on images captured by a user. The disclosed method and system may identify a relevant event from a plurality of events associated with a user based on predefined criteria. Further, the disclosed method and system may determine a set of preliminary information associated with the relevant event and a first set of images captured by the user during the relevant event. Moreover, the disclosed method and system may create a plurality of second sets of images. Each of the plurality of second sets of images comprises an image from the first set of images and at least one similar image. In addition, at least one feature of each of the at least one similar image matches with corresponding feature of the image. Further, the disclosed method and system may present the plurality of second sets of images to the user. Additionally, the disclosed method and system may receive from the user, for each of the plurality of second sets of images user selection of the associated image added from the first set of images. Thereafter, the disclosed method and system may generate a plurality of sets of keywords in response to receiving the user selection. Each of the plurality of sets of keywords is generated for the image selected by the user from an associated second set of images. In addition, each of the plurality of sets of keywords are generated based on the set of preliminary information associated with the relevant event, the image selected by the user, and at least one predefined rule. Further, the disclosed method and system may receive for each of the plurality of sets of keywords, a user selection of one or more keywords. The disclosed method and system may generate a password based on the one or more keywords selected by the user for each of the plurality of sets of keywords and associated images selected by the user for each of the plurality of second sets of images.

The method and system provide some advantages like, the method and system may leverage existing mechanism of password management by automatically generating keywords based on images selected from user's life events (i.e., the relevant event) instead of using generic images. Further, in addition to selection of images and generation of their associated keywords, the disclosed method and system may use chronological order of the selected images to generate the password.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for generating password based on images captured by a user, the method comprising:
    identifying, by a password creation device, a relevant event from a plurality of events associated with a user based on predefined criteria;
    determining, by the password creation device, a set of preliminary information associated with the relevant event and a first set of images captured by the user during the relevant event;
    creating, by the password creation device, a plurality of second sets of images, wherein each of the plurality of second sets of images comprises an image from the first set of images and at least one similar image, and wherein at least one feature of each of the at least one similar image matches with corresponding feature of the image;
    presenting, by the password creation device, the plurality of second sets of images to the user;

receiving from the user, for each of the plurality of second sets of images, by the password creation device, user selection of the associated image added from the first set of images;

generating, by the password creation device, a plurality of sets of keywords in response to receiving the user selection, wherein each of the plurality of sets of keywords is generated for the image selected by the user from an associated second set of images, and wherein each of the plurality of sets of keywords are generated based on the set of preliminary information associated with the relevant event, the image selected by the user, images similar to the image selected by the user, and at least one predefined rule;

receiving, by the password creation device, for each of the plurality of sets of keywords, a user selection of one or more keywords; and generating, by the password creation device, a password based on the one or more keywords selected by the user for each of the plurality of sets of keywords and associated images selected by the user for each of the plurality of second sets of images.

2. The method of claim 1 further comprising collecting the set of preliminary information associated with each of the plurality of events associated with the user.

3. The method of claim 2, further comprising:
analysing actions performed by the user to determine occurrence of the relevant event from the plurality of events; and
selecting the relevant event from the plurality of events based on one or more of a plurality of factors, wherein the plurality of factors comprises event duration, location of the user, people in vicinity of the user, deviation in at least one of the actions based on predefined actions associated with the user, and user confirmation of relevancy of the relevant event.

4. The method of claim 1, wherein the set of preliminary information comprises date and time of each of the first set of images, last minute of the relevant event, duration of the relevant event, location of the relevant event, weather during occurrence of the relevant event, and verification of people in the vicinity of the user present during occurrence of the relevant event.

5. The method of claim 1, wherein selection of the at least one similar image comprises:
determining, via a Machine Learning (ML) model, a set of similar images based on a plurality of features, wherein each of the set of similar images are selected based on matching of the at least one feature of each of the set of similar images with the corresponding feature of at least one of the images selected from the first set of images; and
selecting, via the ML model, each of the at least one similar image from the set of similar images based on a set of parameters, wherein the set of parameters comprises size, focus, sharpness, pixel clarity, and brightness.

6. The method of claim 5, wherein the plurality of features comprises at least one of an entity present in each of the set of similar images, background of each of the set of similar images, landscape of each of the set of similar images, environmental objects present in each of the set of similar images, climate in each of the set of similar images, or context of each of the set of similar images.

7. The method of claim 5, wherein the set of similar images is not captured by the user.

8. The method of claim 1, further comprising:
prompting the user to provide chronological arrangement for each of the associated images selected by the user from each of the plurality of second sets of images;
receiving, from the user, an arrangement of each of the associated images in a chronological order; and
associating the chronological order with the user.

9. The method of claim 6, wherein generating a set of keywords from the plurality of sets of keywords for an associated image comprises:
analyzing, by a ML model, each of the plurality of features of the associated image, wherein analysis of each of the plurality of features of the associated image is done based on the set of preliminary information associated with the relevant event, the associated image, and the at least one pre-defined rule;
determining, by the ML model, a keyword for the associated image based on analysis of each of the plurality of features of the associated image and each of the first set of images captured by the user; and
generating, by the ML model, the set of keywords based on the keyword determined for the associated image, wherein the set of keywords comprises alternative keywords in correspondence to the determined keyword.

10. A method for providing access of a password protected application to a user, the method comprising
rendering, by an electronic device, a plurality of sets of images to the user upon receiving a request from the user for accessing the password protected application;
receiving, by the electronic device, a user selection of an image from each of the plurality of sets of images, wherein each image selected by the user corresponds to an image captured by the user during a relevant event;
rendering to the user, by the electronic device, a set of keywords associated with each image selected by the user;
receiving, by the electronic device, a user selection of one or more keywords from each of the set of keywords associated with each image; and
managing, by the electronic device, an access of the password protected application by the user in response to receiving the user selection.

11. The method of claim 10, further comprises:
receiving from the user, an arrangement of each image selected form each of the plurality of sets of images by the user, wherein the arrangement corresponds to a predefined chronological order.

12. The method of claim 11, wherein managing the access of the password protected application comprising:
performing a check to evaluate at least one of the user selection of the arrangement of each image selected from the plurality of sets of images and the one or more keywords associated with each image;
providing the access of the password protected application to the user in response to receiving correct user selection of the arrangement of each image and the one or more keywords associated with each image; and
denying the access of the password protected application to the user in response of receiving incorrect user selection of at least one of the arrangement of each image and the one or more keywords associated with each image.

13. A graphical user interface (GUI) client for managing user access to a password protected applications, the GUI client configured to:
receive a request from a user for accessing the password protected application;

render, to the user, a plurality of sets of images upon receiving the request;

receive, from the user, a user selection of an image from each of the plurality of sets of images rendered to the user;

render, to the user, a set of keywords associated with each image selected by the user from each of the plurality of sets of images;

receive, from the user, a user selection of one or more keywords from the set of keywords rendered to the user; and manage an access of the password protected application in response to receiving the user selection.

14. A system for generating password based on images captured by a user, the system comprising:
   a processor; and
   a memory communicatively coupled to the processor, wherein the memory stores processor executable instructions, which, on execution, causes the processor to:
      identify a relevant event from a plurality of events associated with a user based on predefined criteria;
      determine a set of preliminary information associated with the relevant event and a first set of images captured by the user during the relevant event;
      create a plurality of second sets of images, wherein each of the plurality of second sets of images comprises an image from the first set of images and at least one similar image, and wherein at least one feature of each of the at least one similar image matches with corresponding feature of the image;
      present the plurality of second sets of images to the user;
      receive from the user, for each of the plurality of second sets of images user selection of the associated image added from the first set of images;
      generate a plurality of sets of keywords in response to receiving the user selection, wherein each of the plurality of sets of keywords is generated for the image selected by the user from an associated second set of images, and wherein each of the plurality of sets of keywords are generated based on the set of preliminary information associated with the relevant event, the image selected by the user, images similar to the image selected by the user, and at least one predefined rule;
      receive for each of the plurality of sets of keywords, a user selection of one or more keywords; and
      generate a password based on the one or more keywords selected by the user for each of the plurality of sets of keywords and associated images selected by the user for each of the plurality of second sets of images.

15. The system of claim 14, wherein the processor executable instructions further cause the processor to:
   collect the set of preliminary information associated with each of the plurality of events associated with the user.

16. The system of claim 15, wherein the processor executable instructions further cause the processor to:
   analyse actions performed by the user to determine occurrence of the relevant event from the plurality of events; and select the relevant event from the plurality of events based on one or more of a plurality of factors, wherein the plurality of factors comprises event duration, location of the user, people in vicinity of the user, deviation in at least one of the actions based on predefined actions associated with the user, and user confirmation of relevancy of the relevant event.

17. The system of claim 14, wherein the set of preliminary information comprises date and time of each of the first set of images, last minute of the relevant event, duration of the relevant event, location of the relevant event, weather during occurrence of the relevant event, and verification of people in the vicinity of the user present during occurrence of the relevant event.

18. The system of claim 14, wherein, to select the at least one similar image, the processor executable instructions further cause the processor to:
   determine a set of similar images based on a plurality of features, wherein each of the set of similar images are selected based on matching of the at least one feature of each of the set of similar images with the corresponding feature of at least one of the images selected from the first set of images; and
   select each of the at least one similar image from the set of similar images based on a set of parameters, wherein the set of parameters comprises size, focus, sharpness, pixel clarity, and brightness.

19. The system of claim 18, wherein the plurality of features comprises at least one of an entity present in each of the set of similar images, background of each of the set of similar images, landscape of each of the set of similar images, environmental objects present in each of the set of similar images, climate in each of the set of similar images, or context of each of the set of similar images.

20. The system of claim 18, wherein the set of similar images is not captured by the user.

21. The system of claim 14, wherein the processor executable instructions further cause the processor to:
   prompt the user to provide chronological arrangement for each of the associated images selected by the user from each of the plurality of second sets of images;
   receive, from the user, an arrangement of each of the associated images in a chronological order; and
   associate the chronological order with the user.

22. The system of claim 19, wherein, to generate a set of keywords from the plurality of sets of keywords for an associated image, the processor executable instructions further cause the processor to:
   analyze each of the plurality of features of the associated image, wherein analysis of each of the plurality of features of the associated image is done based on the set of preliminary information associated with the relevant event, the associated image, and the at least one predefined rule;
   determine a keyword for the associated image based on analysis of each of the plurality of features of the associated image and each of the first set of images captured by the user; and
   generate the set of keywords based on the keyword determined for the associated image, wherein the set of keywords comprises alternative keywords in correspondence to the determined keyword.

* * * * *